May 17, 1955 F. A. HOWARD Re. 24,004

COLLAPSIBLE MINING HEAD

Original Filed Oct. 29, 1945 5 Sheets-Sheet 1

INVENTOR.
FRANK A. HOWARD
BY
Kenyon + Kenyon
ATTORNEY

COLLAPSIBLE MINING HEAD

Original Filed Oct. 29, 1945 5 Sheets-Sheet 2

INVENTOR.
FRANK A. HOWARD
BY
Kenyon & Kenyon
ATTORNEY

May 17, 1955 F. A. HOWARD Re. 24,004

COLLAPSIBLE MINING HEAD

Original Filed Oct. 29, 1945 5 Sheets-Sheet 3

INVENTOR.
FRANK A. HOWARD
BY
Kenyon & Kenyon
ATTORNEY

COLLAPSIBLE MINING HEAD

Original Filed Oct. 29, 1945 5 Sheets-Sheet 4

INVENTOR.
FRANK A. HOWARD
BY
Kenyon & Kenyon
ATTORNEY

COLLAPSIBLE MINING HEAD

Original Filed Oct. 29, 1945 5 Sheets-Sheet 5

INVENTOR.
FRANK A. HOWARD
BY
Kenyon & Kenyon
ATTORNEY

United States Patent Office

Re. 24,004
Reissued May 17, 1955

24,004

COLLAPSIBLE MINING HEAD

Frank A. Howard, New York, N. Y., assignor, by mesne assignments, of one-tenth to Pittsburgh Consolidation Coal Company, Pittsburgh, Pa., a corporation of Pennsylvania Original No. 2,606,010, dated August 5, 1952, Serial No. 625,413, October 29, 1945. Application for reissue June 9, 1953, Serial No. 360,627

5 Claims. (Cl. 262—7)

Matter enclosed in heavy brackets [ ] appears in the original patent but forms no part of this reissue specification; matter printed in italics indicates the additions made by reissue.

This invention relates to the production of solid fuels from underground coal seams and will be understood from the following description taken in connection with the annexed drawings.

In these drawings.

Figure 1:
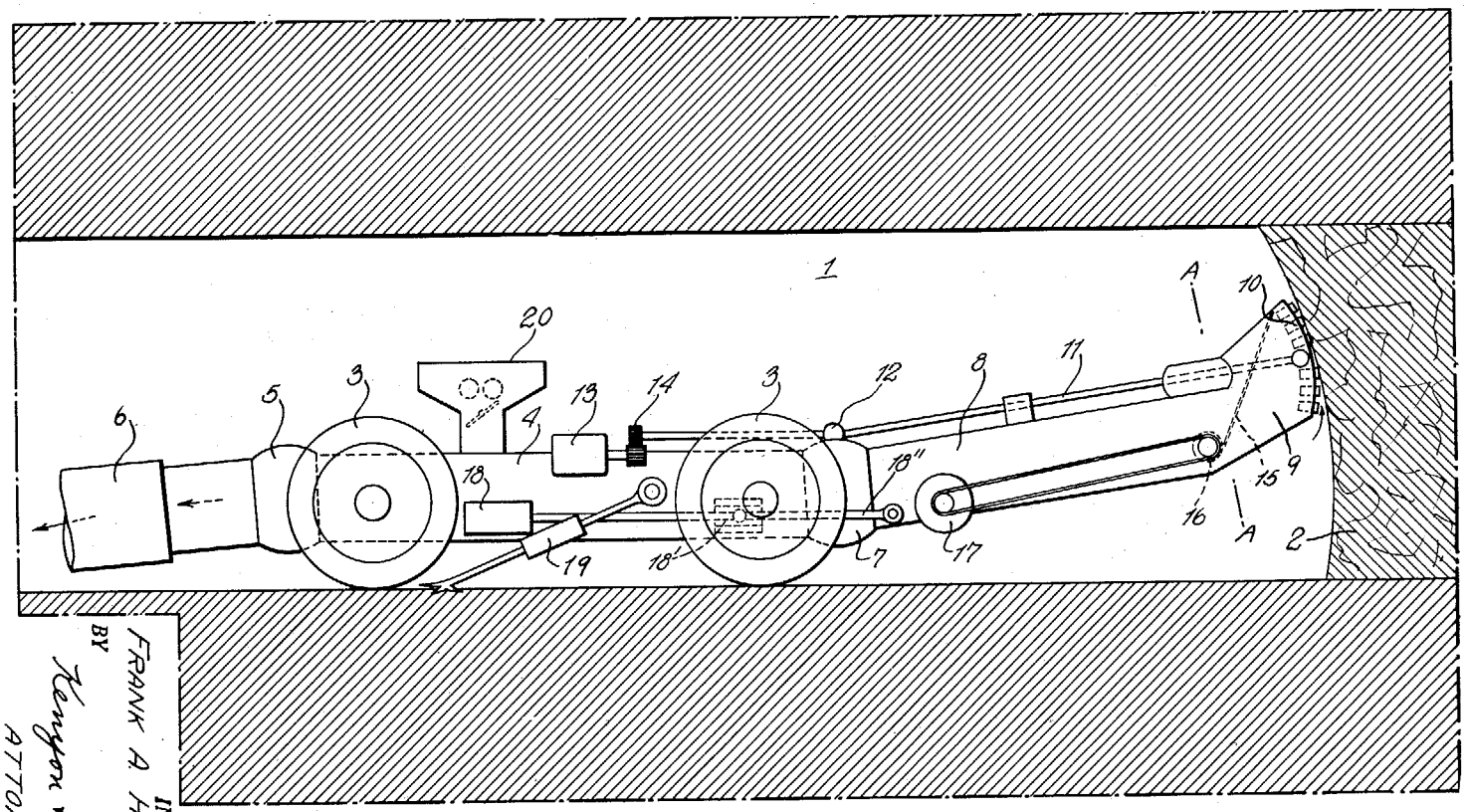
Figure 1 is a cross-section through the working place in an underground coal mine showing the apparatus for the mechanical mining and transportation of the coal in side view.

Referring more particularly to the drawings, the numeral 1 in Figure 1 designates an underground working place in which a coal seam, designated 2, is exposed.

There are two main steps in the underground mining of coal: First, breaking the coal loose from the seam, vein or formation in which it occurs, and second, transporting the loosened coal to the surface. In the preferred embodiment of my invention, substantially the entire body of the coal mined is broken loose by mechanical cutters designed and operated so as to detach the coal from the seam very largely in the form of fine particles which are small enough to be carried away from the working face by a current of moving fluid.

A moving current of fluid, either the same one which carries the particles away from the face as they are detached or an augmented current, also conveys the particles through suitable confined passages from the working place to a sump or storage reservoir from which the coal can be lifted to the surface by mechanical elevators, or preferably, directly to the surface in the moving fluid current.

Figure 1A:
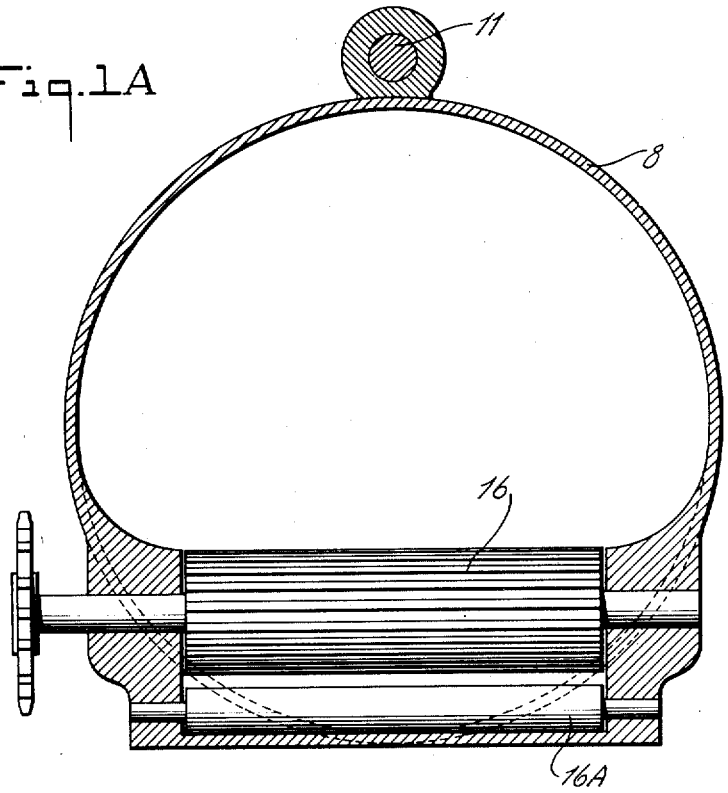
Figure 1A is an enlarged cross-section on the line A—A of Figure 1.

To carry out this operation there may be used apparatus of the form shown diagrammatically in Figure 1. Such apparatus may consist of a mobile mining machine mounted on wheels, designated 3. The machine carries a horizontal conduit 4 which has universal swivel connections at the front and rear. At the rear connection 5 there is fastened an end section 6 of the transportation conduit forming a part of a vacuum transportation system leading from the working place to some remote point. The end conduit section 6 is telescopic so that the machine may advance away from the conduit without breaking the connections. The joint 7, on the conduit 4 supports a universal type of cutter which consists of a long trunk 8 enlarged and slightly up-tilted at the outer end as shown at 9. In this outer end there is carried a curved cutterhead 10 which may be of the roller-bit type, the actual cutting elements being toothed rollers mounted on radial arms of the cutterhead. Such roller-bits are commonly used in drilling for oil with rotary rigs. The cutterhead is driven by shaft 11 universally jointed at 12. Power is supplied to the cutterhead through a motor 13, and gears 14, mounted on the frame of the machine. In the up-tilted and enlarged end 9, there may be mounted an inclined screen 15 intended to catch lumps and large particles of coal and divert them to the bottom of the head where they pass under the screen and are crushed by a corrugated roller 16 which turns against a small idle roller 16a, as shown in Figure 1A, and is driven by chain or belt from a motor 17 supported near the base of the trunk 8. Hydraulic cylinders 18 carried by the frame of the machine are connected through crossheads 18′ and connecting links 18″ to the trunk 8. Through the control of two such cylinders, one on each side of the machine, the cutter may be raised and lowered and swung from side to side to cover in an arc the entire working face in a "short wall" working place, the connections of the links being provided with universal joints to facilitate such operation. The machine may be advanced positively and forcibly against the working face by hydraulic sprag-type jacks 19 on each side of the machine, the points of these jacks engaging the floor of the working place. To take care of such portion of the coal as may be dislodged from the seam and fall outside of the cutterhead, there may be provided a separate crusher 20 located on top of the machine, into which the loose coal may be loaded by hand or by a separate loading machine. The crusher discharges through a suitable valve connection into the conduit 4.

The mining of coal according to my invention may be carried out with the machine illustrated in Figure 1 as follows:

By the motor 13 the roller-bit cutter 10 is positively driven to detach the coal from the face of the seam 2 in the form of fine particles. These fine particles are caught up by an air current entering the cutterhead from the atmosphere of the working place through the space between the cutterhead and the seam. Sufficiently fine particles of coal remain in suspension in the air current and are carried through the screen 15 directly into the trunk 8 and thence through the conduit 4 and the telescopic section 6 to some remote point where they are collected and disposed of according to any of the usual methods and procedures used in vacuum dust-collecting systems. Particles of coal which are too large to be readily carried in suspension in the air current or to pass through the inclined screen 15 fall to the base of the cutter and pass beneath the constantly driven roller-crusher 16. The screen 15 must be of sufficiently large mesh to avoid blinding or blanketing. The crushing roller 16 is designed to reduce all the coal to a size sufficient to permit the particles to be carried along by the air current. The cutterhead may be positively fed toward the face of the coal seam by the hydraulic sprags 19. By the hydraulic cylinders 18 it may be caused to traverse the face of the coal seam in horizontal or vertical arcs.

Any combination of these movements may be used. Loose coal dislodged from the seam and falling outside of the cutterhead may be loaded by hand or by the use of any of the known mechanical loading machines or conveyors into the hopper of the crusher 20, which may be continuously or intermittently operated to grind the loose coal and discharge it by gravity assisted, to any extent desired, by leakage of indrawn air, into the conduit 4.

By the operation of the apparatus in the manner described, it will be seen that the coal is continuously detached by mechanical action from the face of the coal seam, reduced to small particles and transported from the working place to a remote point by an air current drawn from the atmosphere of the working place and moving outward in a confined passage to some indefinitely remote point where the coal is separated and collected from the air current by known procedure. The mining and transportation of coal is, by this procedure, made continuous and completely mechanized, save for the handling of small portions of coal accidentally dislodged by the cutterhead and falling outside of the cutterhead or trimmed from the seam by hand for other incidental reasons. This small portion of separately dislodged coal may require supplementary hand labor to collect it and deliver it into the supplementary crusher forming a part of the machine. It will be noted that since the air current used for conveying the coal from the working place is drawn from the atmosphere of the working place, the mining method and apparatus in itself forms a supplementary mine ventilation system in which fresh air is continuously drawn from the outside to the working place and delivered from the working place in a confined passage along with the outgoing coal. This greatly reduces the dust nuisance and the fire and explosion hazards of dust and gas in the working place. The complete elimination of the drilling and shooting of the coal seam further contributes to the safety and economy of the operation and makes possible complete continuity of actual coal recovery operations.

The main motor 13, the front crusher motor 17 and such other supplementary motors as may be required in the operation of the supplementary crusher 20, for the propulsion of the machine and for the actuation of the hydraulic mechanisms, may conveniently all be electric motors supplied with current through extensible cables drawn behind the machine in accordance with ordinary practice in the provision of power for underground mining machines.

Figure 3:
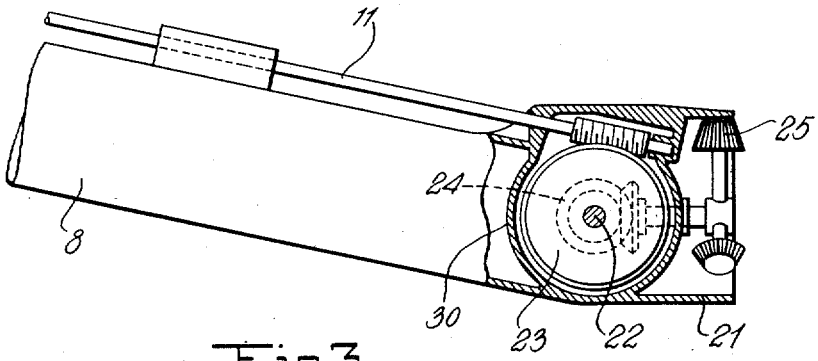
Figure 3 is a section on the line 3—3 of Figure 2.
Figure 2:
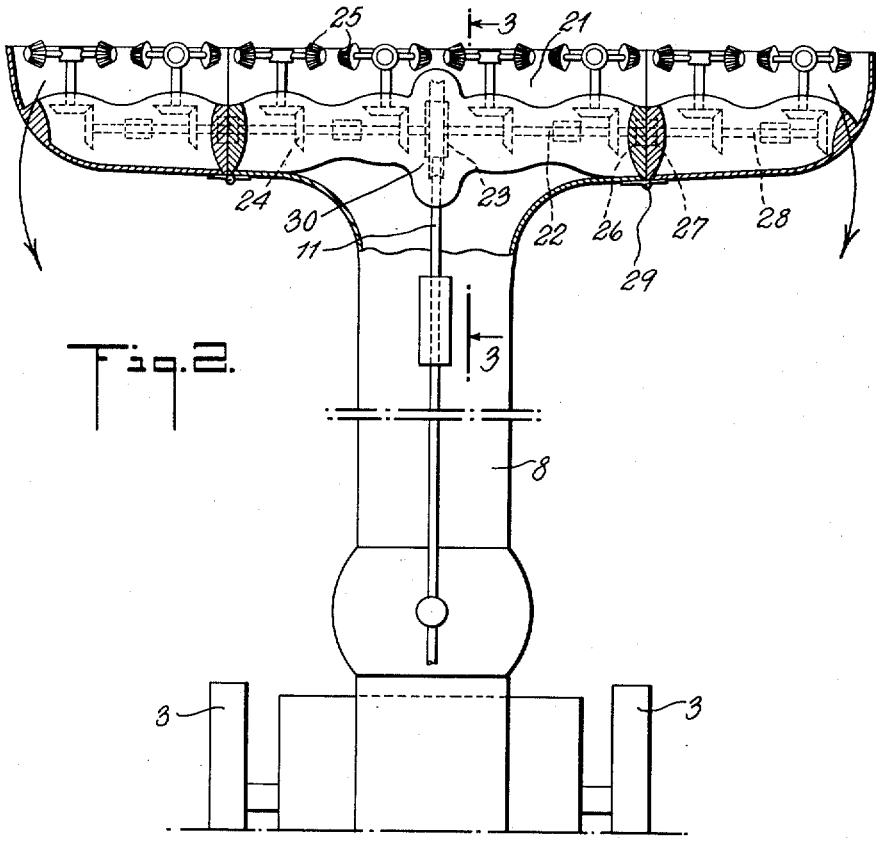
Figure 2 is a top plan view, partly in horizontal section of a modified form of cutterhead for use on the apparatus of Figure 1.
Figure 4:
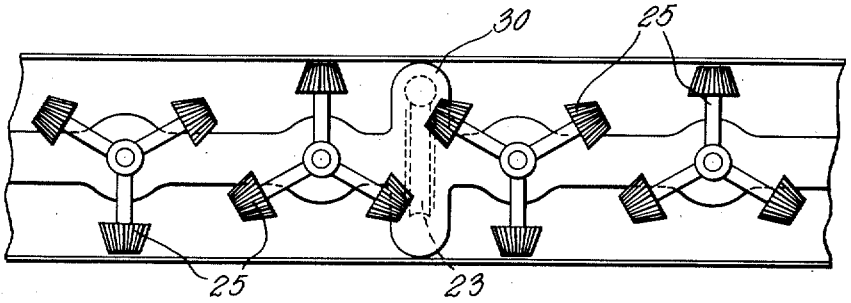
Figure 4 is a front view of the face of the cutterhead shown in Figures 2 and 3.

In Figures 2 to 4 I have shown various modifications of the apparatus illustrated in Figure 1. In Figure 2 there is shown a T-head design of cutter in which the trunk 8 carries a horizontal T-head made up of a central section and two hinged end sections. The central section designated 21 carries the main driving shaft 22 on which there is mounted the driving gear 23, which is driven by the main drive shaft 11 as shown in Figure 1. Driving gears 24 mounted on the shaft 22 drive a plurality of small roller-bit cutterheads 25 mounted in the open front end of the cutterhead. At each end the shaft 22 carries a jaw clutch 26. When the cutterhead is in operative position, as shown in Figure 2 the jaw clutch engages a similar clutch 27 in an end shaft 28. The end shaft 28 in turn drives the roller-bit cutters in the end sections of the cutterhead. The end sections carrying the complete assembly above described are joined to the main or central section by hinges 29 with suitable locking devices (not shown). The driving gears in the cutterhead may be enclosed by casing 30 which supports the bearings for the shafts and protects the gears from direct impingement of the coal particles and permits their lubrication. The T form of cutterhead shown in Figures 2, 3 and 4 may be made wide enough to extend across the entire face of a normal short wall operation, say 16 to 20 feet. This type of cutterhead needs to be moved only vertically, such vertical feed together with the advance of the machine against the working face serving all needs. Preferably the stationary central section of the T form of cutterhead will be of the approximate width of the machine itself, the balance of the width being supplied by the hinged end sections. By turning these hinged end sections back, as shown by the arrow in Figure 2, so they are parallel with the trunk 8, the machine may be easily maneuvered underground through narrow entries and between roof supports.

Figure 5:
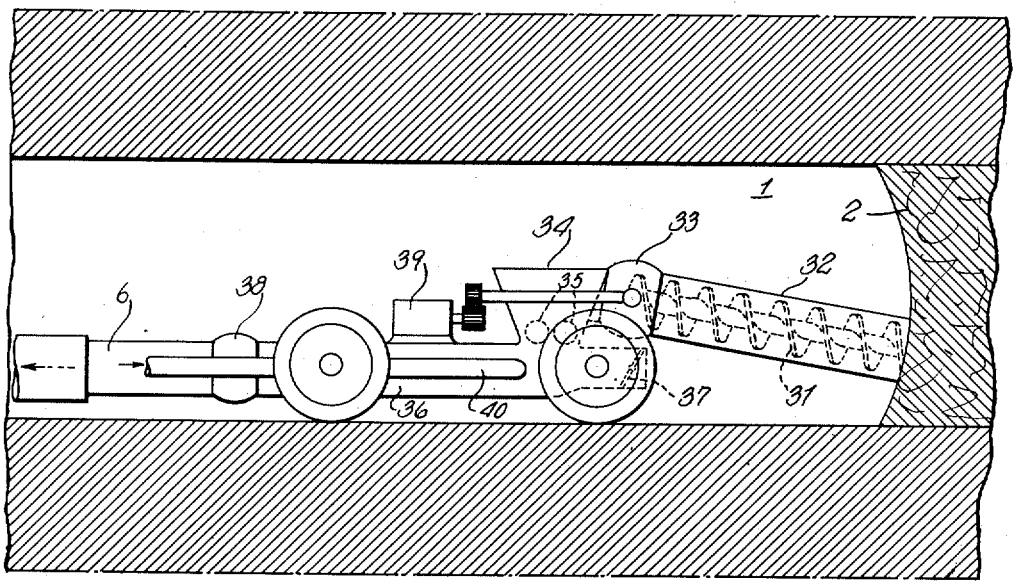
Figure 5 is a view similar to Figure 1 but showing an alternative form of apparatus in which the coal is detached from the seam and delivered to the hopper of a crushing apparatus by an auger-bit type of cutter and conveyor.

In Figure 5 there is shown a form of machine in which the coal is detached from the seam by a large cutter in the form of an auger bit 31 turning inside of a trunk or casing 32 which is universally jointed at 33 and may be controlled by hydraulic power cylinders and connecting rods in the same manner as the machine shown in Figure 1 so as to traverse the entire face of the short wall. The auger-bit type of cutter acts as both cutter and conveyor and discharges at its upper end into a hopper 34 surmounting crushing rollers 35. The crushing rollers discharge into the conduit 36. Air is admitted from the atmosphere of the working place partly through the auger bit casing directly from the working face via the leakage space around the crushing rollers and partly by a supplementary valved inlet 37. The conduit 36 is connected to the main vacuum system by telescopic conduit section 6 through a universal joint 38 as in Figure 1. The auger bit is driven by a main motor 39. The auger bit type of cutter and conveyor as shown in Figure 5 permits better control of the relative quantities of coal and air delivered through the conduit 6 from the working place and thus may diminish the hazards of dust explosion in the conduit or at the cutterhead. The explosion hazard in the conduit may be further reduced by the admission of inert gas, for example combustion gas, through a supplementary supply conduit 40 parallel to the outlet conduit 6 and connected into the air conduit just below the crusher rollers 35. By supplying through an appropriate distribution system combustion gas substantially devoid of free oxygen at this point, the ratio of free oxygen to carbon in the conveyor conduit 6 may be reduced to any desired extent. The machine illustrated in Figure 5 is largely diagrammatic, details such as driving mechanism and hydraulic controls for the cutters and for advancing the machine against the working face being omitted for the sake of clarity.

Figure 6:
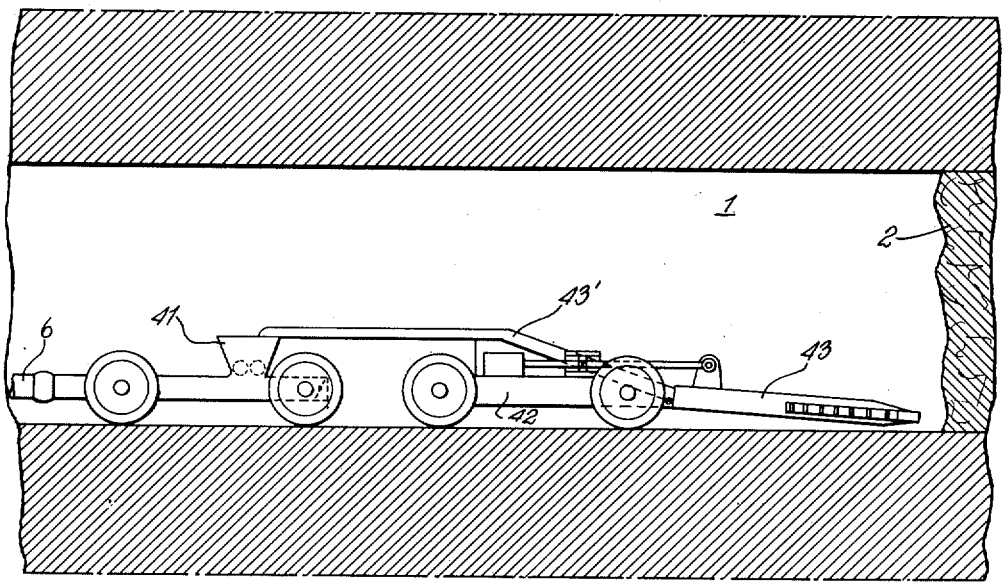
Figure 6 is a similar view of a still further modification in which two separate machines are used in the working place, one for digging and/or loading the coal and the other for crushing it and delivering it into the transportation system.

In Figure 6 I have shown a still further modification in which two separate machines are used in the working place. The first machine carries a coal crusher designated 41 mounted in the base of an open hopper and delivering into a conduit in the same manner as heretofore described in connection with Figure 5. The coal is supplied to the open hopper 41 by an ordinary type of coal loading machine designated 42. The body of this machine carries in the front section a digger and loader designated 43 and in the rear section a conveyor 43' which extends over the open top of the hopper 41. The coal handled by the loader 43 may have been previously loosened from the seam by hand or by cutting, drilling and shooting in accordance with standard practice or it may be detached from the seam by any known form of mechanical diggers or cutters.

Figure 7:
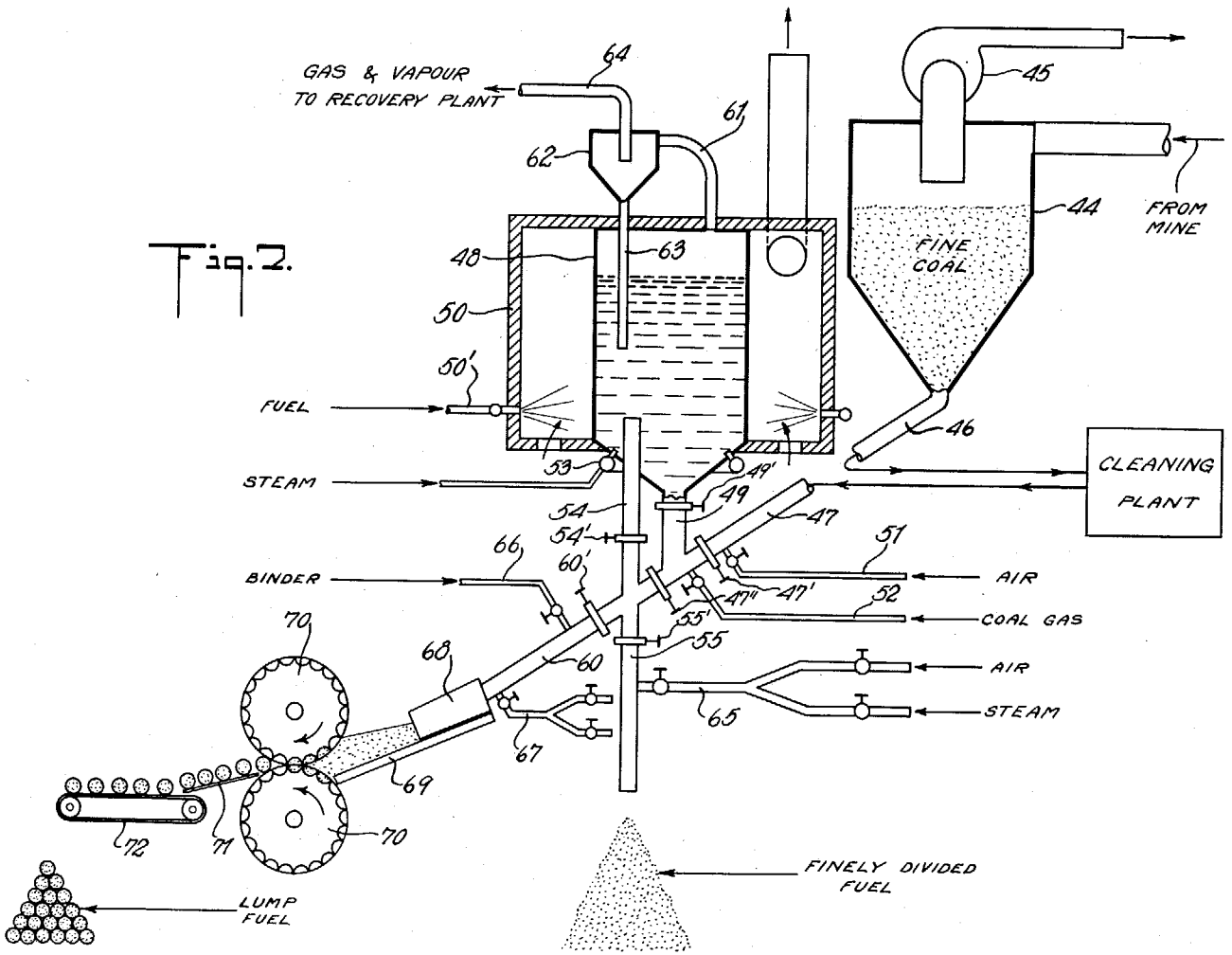
Figure 7 is a diagrammatic elevation, partly in section, of the surface installations employed in the practice of the invention.

In Figure 7 I have shown diagrammatically those elements of the surface installations which are directly involved in the practice of the invention and have indicated their relations to other usual elements of surface installations not so directly involved.

The vacuum transportation system which may connect with any number of undeground working places terminates in a cyclone dust collector 44 from which the carrier gases are withdrawn by the vacuum blower 45. The cyclone is preferably of considerable size and serves as a storage reservoir for the fine coal. The fine coal flows by gravity from the bottom of the cyclone through an inclined pipe 46 which may deliver to a cleaning plant of any conventional type from which the coal again flows by gravity to the other surface installations, or the coal may flow directly to such other installations.

The coal, in a cleaned or uncleaned condition as the case may be, flows by gravity through the inclined pipe 47 to a manifold system by which it may be diverted through a retort 48 or delivered directly to storage. In the event the coal is to be delivered through the retort, the valve 47' is opened and the valve 47'' closed; and the coal passes from the pipe 47 through the riser 49 into the bottom of the vertical retort 48, which is mounted in the furnace 50 heated by the combustion of fuel from spray nozzles 50'. To maintain the fine coal in a fluidized condition, air may be injected into the pipe 47 through the line 51 and coal gas may be injected just below the riser 49 through the pipe 52. By maintaining the fine coal in a fluidized condition, the gravity head on the pipe 47 delivers a regulated stream of coal through valve 47', as indicated, to the pipe junction below the riser 49 and the fluidized condition being maintained by the admission of coal gas under pressure at this point, the fine coal flows upwardly into the retort. A circular distributing manifold 53 below the retort delivers steam at a plurality of points around its conical bottom. This steam, together with the coal gas admitted through the pipe 52, maintains the finely divided solid contents of the retort in a constant state of agitation similar to that of a boiling liquid and this effects a rapid heat transfer from the heated walls of the retort to the coal.

The time of residence of the coal in the retort is regulated with reference to the temperature of the latter so as to effect the desired reduction in the volatile content of the coal. In any case, it is desirable that the residence time be long enough to reduce to a low percentage the coal present in the retort which in passing through the temperature range in which plasticity may develop and interfere with the maintenance of fluid conditions. The devolatilized coal is withdrawn from the retort by means of a pipe 54 which delivers into the manifold system through an appropriate valve 54'. From the manifold system the finely divided devolatilized coal withdrawn from the retort may be delivered directly to storage through the line 55 or may be diverted through the line 60 to the briquetting plant by operation of valves 55' and 60'. The admission of fine coal to the retort through the line 47 and withdrawal through line 54 is regulated by the valves 47', 49' and 54' to maintain the level of the dense phase of the finely divided material in the retort at some point below the top of the retort. Vapors and gases, together with a certain amount of entrained dust are withdrawn from the top of the retort through the line 61 and put through a cyclone dust collector 62. The collected solids drain by gravity from the bottom of the dust collector through a dip pipe 63 which extends well below the level of the dense phase in the retort. The coal gas and associated condensable vapors evolved from the coal in the retort, leave the cyclone through an outlet 64 and pass to a suitable condensate recovery plant in which the condensable fractions are separated and recovered in accordance with known practice and the stripped coal gas separately disposed of.

In the event the devolatilized finely divided coal is to be delivered from the retort 48 directly to storage, it is advisable to inject a fluidizing gas, which in this instance may be steam, into the outlet line 55 through a connection 65 from whence it may pass upward to the retort through the line 54 and maintain the entire discharge system in fluidized condition. In the event it is desired to by-pass the retort and deliver the fine coal directly to storage, lines 49, 54 and 60 are closed off and line 55 is opened, thus permitting direct discharge of fine coal through the manifold system. In this case, air is admitted through the connection 65, maintaining a fluidized condition of the discharging coal in the manifold system.

Wherever fluidizing gas, such as air, steam or coal gas, is employed, it has the effect of keeping the particles of solid coal separated by a film of gas, so that the finely divided coal is maintained in a fluid state in which it is capable of flowing more or less like a liquid. The amount of fluidizing gas need not be large, its purpose being to prevent the powdered material from packing so that it will not flow. On the other hand, the powdered coal in the vacuum transporting system may be entrained with a relatively large volume of air, most of this being discharged in the upperpart of the collector 44. The fuel deposited in the collector, however, retains sufficient air to remain initially in a fluidized state and this condition is maintained permanently by the air admitted through line 51. As the finely divided coal in the collector, the retort 48 and the lines 46, 47 and 49 is kept in a fluidized state and as the pressure head produced by the material in the collector and lines 46 and 47 is maintained greater than the pressure head of the material in the retort 48 and line 49, the finely divided coal will flow readily from the collector to the retort. This effect is enhanced by the fluidizing air and coal gas admitted at 51 and 52, as they decrease the bulk density of the material in the retort and in line 49 and accordingly the pressure head produced by this material.

In the event it is desired to produce a solid fuel in predetermined sizes, this may be accomplished through the briquetting plant to which the line 60 delivers. A liquid binder may be introduced through the connection 66 into the pipe 60 and fluidizing air or steam through the connection 67 near the outlet end of the pipe 60. At its lower end the pipe 60 discharges into a distributor 68, thence on to an apron 69 which feeds a pair of briquetting rolls 70. As shown, these briquetting rolls have matching recesses in their faces which serve to form and compress the finely divided fuel mixed with binder into briquettes of predetermined sizes which are discharged by an apron 71 onto a conveyor 72 by which they are carried to storage, being permitted to cool to any desired extent en route to storage in accordance with the usual practice.

Through the use of the surface equipment shown diagrammatically in Figure 7, in combination with the underground equipment shown in Figures 1 to 6, solid carbonaceous fuel in predetermined lump sizes may be produced from underground coal seams by continuous and efficient mechanical processes involving the minimum of direct labor. The equipment and methods described are also capable of producing low-volatile solid carbonaceous fuel in the most effective manner, by distilling the finely divided coal while still maintaining it in a finely divided condition, which permits it to be handled as a fluid as shown and described. The devolatilized finely divided fuel may be either briquetted into lumps of predetermined sizes or delivered directly to storage for use as low-volatile finely divided coal.

By the use of the methods, apparatus and machines of my invention, the art of solid fuel production becomes a completely mechanized, continuous and integrated operation for recovering coal from underground coal deposits, delivering it to the surface and handling it at the surface by the most efficient processes for the production of the most valuable products.

While I have shown and described in some detail in the foregoing specification several methods of carrying out my invention, it will be understood that these details are illustrative only and for the purpose of making the invention more clear, and that I do not intend to indicate that my invention is limited to such details or any of them, save insofar as they are included within the terms of the following claims in which it is my intention to claim all novelty inherent in the invention as broadly as possible in view of the prior art.

I claim:

1. A mobile mining machine comprising a frame, a conveying conduit carried thereby, connections at the rear end of such conduit for joining it to a vacuum system, a vacuum trunk carried by the front end of the frame and connected with the conduit by a joint permitting relative angular movement of the trunk, a cutterhead including a cutter mounted on the outward end of the trunk, said cutterhead being T-shaped and comprising a fixed central section and hinged end sections adapted to be swung backwards to reduce the width of the machine, power means located on the machine for driving the cutter mounted in such cutterhead, power means for driving the cutterhead across the exposed face of the seam by angular movement of the trunk and power means for advancing the machine toward the face of the seam.

[2. A mobile mining machine comprising a frame, a cutterhead carried by said frame and comprising a plurality of sections, each section comprising a plurality of cutters mounted on a plurality of rotatable shafts which are arranged in substantially parallel relationship and in substantially the same plane and which are so positioned with respect to one another that upon rotation of said shafts substantially contiguous circles are described by the cutters in substantially the same plane, driving means for effecting rotation of said rotatable shafts, at least one of said sections being adapted to be disengaged from said driving means while another section is retained in operative relationship with said driving means, and power means for advancing the machine toward the face of the seam.]

[3. A mobile mining machine comprising a frame, a cutterhead carried by said frame comprising a plurality of sections, each section comprising a plurality of cutters mounted on a plurality of rotatable shafts which are arranged in substantially parallel relationship and in substantially the same plane and which are so positioned with respect to one another that upon rotation of said shafts substantially contiguous circles are described by the cutters in substantially the same plane, driving means for effecting rotation of said rotatable shafts, at least one of said sections being movable with respect to another section to alter the width of said cutterhead, and power means for advancing the machine toward the face of the seam.]

[4. A machine constructed in accordance with claim 3 in which the cutterhead comprises a fixed central section and hinged end sections adapted to be swung backwards.]

5. A mobile mining machine comprising a frame, a cutterhead carried by said frame comprising a fixed central section and hinged end sections adapted to be swung backwards to reduce the width of the machine, each of said sections including a cutter, power means located on the machine for driving the cutters mounted in the cutterhead, and power means for advancing the machine toward the face of the seam.

*6. A mobile mining machine comprising a frame, a cutterhead carried by said frame comprising a plurality of sections including a fixed central section and hinged end sections adapted to be swung backwards, each section comprising a plurality of cutters mounted on a plurality of rotatable shafts which are arranged in substantially parallel relationship and in substantially the same plane and which are so positioned with respect to one another that upon rotation of said shafts substantially contiguous circles are described by the cutters in substantially the same plane, driving means for effecting rotation of said rotatable shafts and power means for advancing the machine toward the face of the seam.*

*7. A mobile mining machine comprising a frame, a cutterhead carried by said frame comprising a fixed section and a hinged section connected to said fixed section, each of said sections including a cutter, means for driving the cutters mounted in the cutterhead, and power means for advancing the machine.*

*8. A mobile mining machine comprising a frame, a cutterhead carried by said frame comprising a fixed section and a hinged section connected to said fixed section, means for driving the cutters mounted in the cutterhead, said driving means including operatively connected but disengageable driving elements associated respectively with said fixed section and said hinged section, said elements being disengaged upon movement of said hinged section from its normal working position, and power means for advancing the machine.*

References Cited in the file of this patent or the original patent

UNITED STATES PATENTS

| | | |
|---|---|---|
| 504,179 | Stanley | Aug. 29, 1893 |
| 550,051 | McKinlay | Nov. 19, 1895 |
| 957,364 | O'Toole et al. | May 10, 1910 |
| 1,011,994 | O'Toole | Dec. 19, 1911 |
| 1,068,015 | Stewart | July 22, 1913 |
| 1,191,864 | Wittich | July 18, 1916 |
| 1,335,723 | Campbell | Apr. 6, 1920 |
| 1,603,621 | McKinlay | Oct. 19, 1926 |
| 1,645,007 | Johansen | Oct. 11, 1927 |
| 1,856,065 | Austin | May 3, 1932 |
| 1,993,948 | Schroeder | Mar. 12, 1935 |
| 1,999,261 | Schultz et al. | Apr. 30, 1935 |
| 2,059,415 | Thomas et al. | Nov. 3, 1936 |
| 2,064,660 | Haas | Dec. 15, 1936 |
| 2,118,490 | Challacombe | May 24, 1938 |
| 2,194,466 | Cadwallader | Mar. 26, 1940 |
| 2,269,781 | Osgood | Jan. 13, 1942 |
| 2,375,689 | Reeder | May 8, 1945 |

FOREIGN PATENTS

| | | |
|---|---|---|
| 3,595 of 1890 | Great Britain | Feb. 28, 1891 |
| 182,860 | Great Britain | July 10, 1922 |